(12) United States Patent
Shah et al.

(10) Patent No.: US 9,049,632 B1
(45) Date of Patent: Jun. 2, 2015

(54) IDLE MODE HANDOFF TRANSFER OF NETWORK ACCESS INFORMATION

(75) Inventors: Maulik K. Shah, Overland Park, KS (US); Sachin R. Vargantwar, Macon, GA (US); Jasinder Pal Singh, Olathe, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 304 days.

(21) Appl. No.: 13/477,182

(22) Filed: May 22, 2012

(51) Int. Cl.
*H04W 4/00* (2009.01)
*H04W 36/00* (2009.01)
*H04W 36/14* (2009.01)
*H04W 60/00* (2009.01)
*H04W 36/08* (2009.01)

(52) U.S. Cl.
CPC ............ *H04W 36/14* (2013.01); *H04W 60/005* (2013.01); *H04W 36/08* (2013.01)

(58) Field of Classification Search
None
See application file for complete search history.

(56) References Cited

U.S. PATENT DOCUMENTS

| 7,577,434 | B2* | 8/2009 | Nakano et al. | 455/436 |
|---|---|---|---|---|
| 8,311,053 | B2* | 11/2012 | Choi | 370/442 |
| 8,509,779 | B2* | 8/2013 | Ali et al. | 455/436 |
| 2010/0135206 | A1 | 6/2010 | Cherian et al. | |
| 2010/0296419 | A1 | 11/2010 | Kim et al. | |
| 2011/0014919 | A1 | 1/2011 | Otte et al. | |
| 2011/0105122 | A1* | 5/2011 | Wu | 455/436 |
| 2011/0269448 | A1 | 11/2011 | Chen | |
| 2012/0202500 | A1* | 8/2012 | Wu | 455/436 |
| 2013/0084861 | A1* | 4/2013 | Zhao et al. | 455/435.2 |
| 2013/0272132 | A1* | 10/2013 | Heo et al. | 370/236.2 |

* cited by examiner

Primary Examiner — Jutai Kao

(57) ABSTRACT

Systems, methods, and software for providing network access information to a wireless communication device are provided herein. In one example, method of operating a communication system is provided. The method includes communicating with a wireless communication device over a long-term evolution (LTE) wireless communication link provided by a first wireless access node, detecting a handoff from the first wireless access node to a second wireless access node for the wireless communication device when the wireless communication device is in an idle mode of operation, and responsive to the handoff, transferring network access information for a non-LTE network to the wireless communication device.

18 Claims, 3 Drawing Sheets

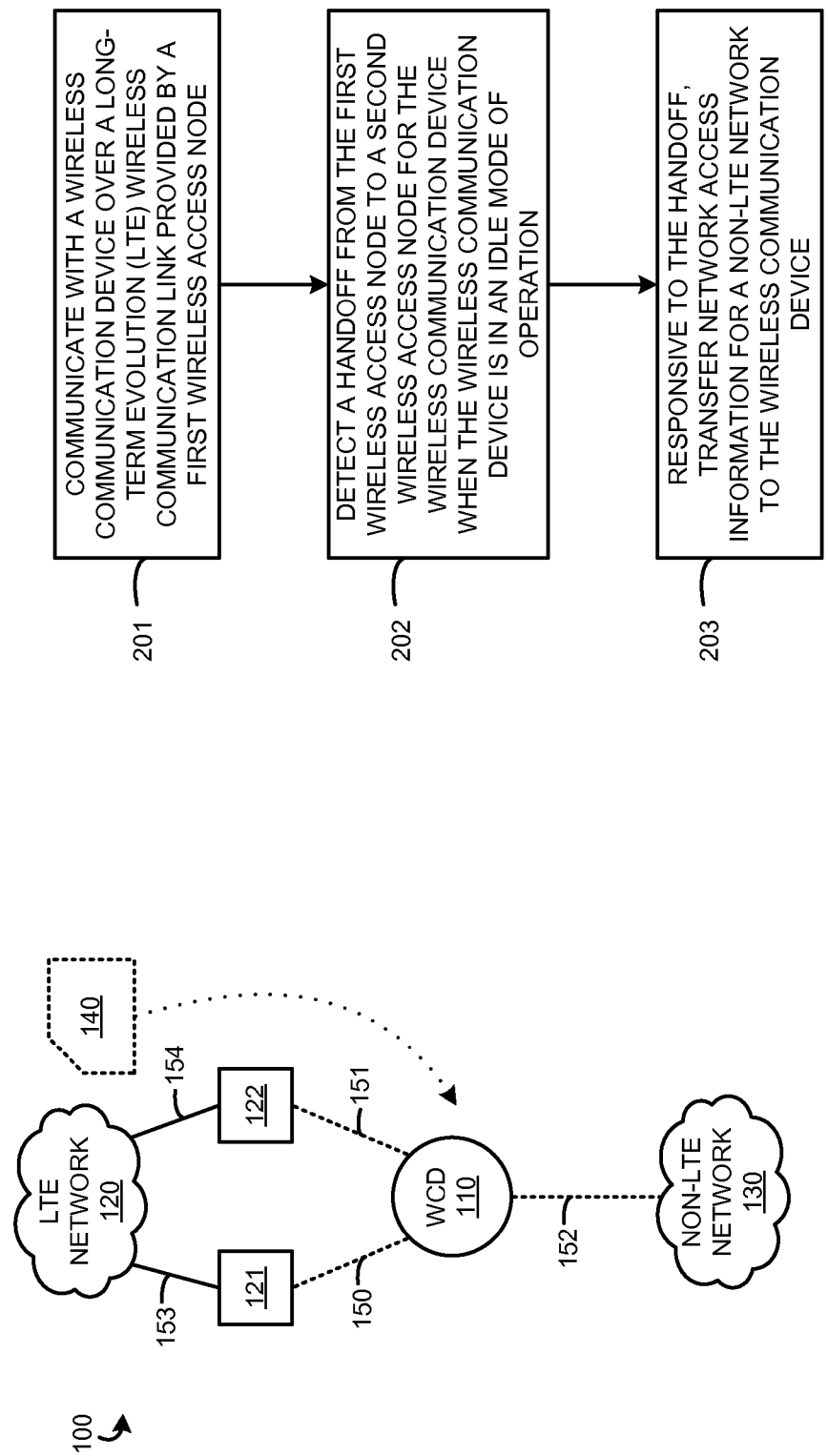

IDLE MODE HANDOFF TRANSFER OF NETWORK ACCESS INFORMATION

TECHNICAL FIELD

Aspects of the disclosure are related to the field of communications, and in particular, transferring network access information for non-LTE (Long Term Evolution) communication services to wireless communication devices over an LTE wireless link in wireless communication networks.

TECHNICAL BACKGROUND

Wireless communication networks, such as cellular service networks, can provide network access information. One common pathway is via a pilot or beacon signal which a wireless network may broadcast for receipt by prospective wireless communication devices. Other times, the network access information is received by a wireless communication device prior to any access attempts, such as through a prior communication session, via another type of wireless network, or having been previously stored in a computer-readable medium of the wireless communication device.

However, providing this network access information for a wireless network to wireless communication devices using another wireless network can consume bandwidth and wireless resources of the other wireless network. This can especially be undesirable when the network access information is broadcast without regard to actual demand of prospective wireless communication devices.

Overview

Systems, methods, and software for providing network access information to a wireless communication device are provided herein. In one example, method of operating a communication system is provided. The method includes communicating with a wireless communication device over a long-term evolution (LTE) wireless communication link provided by a first wireless access node, detecting a handoff from the first wireless access node to a second wireless access node for the wireless communication device when the wireless communication device is in an idle mode of operation, and responsive to the handoff, transferring network access information for a non-LTE network to the wireless communication device.

In another example, a communication system is provided. The communication system includes a first wireless access node configured to communicate with a wireless communication device over a long-term evolution (LTE) wireless communication link provided by the first wireless access node, and a control system configured to detect a handoff from the first wireless access node to a second wireless access node for the wireless communication device when the wireless communication device is in an idle mode of operation. The second wireless access node is configured to, responsive to the handoff, transfer network access information for a non-LTE network to the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a system diagram illustrating a communication system.

FIG. 2 is a flow diagram illustrating a method of operation of a communication system.

DETAILED DESCRIPTION

Figure 3:
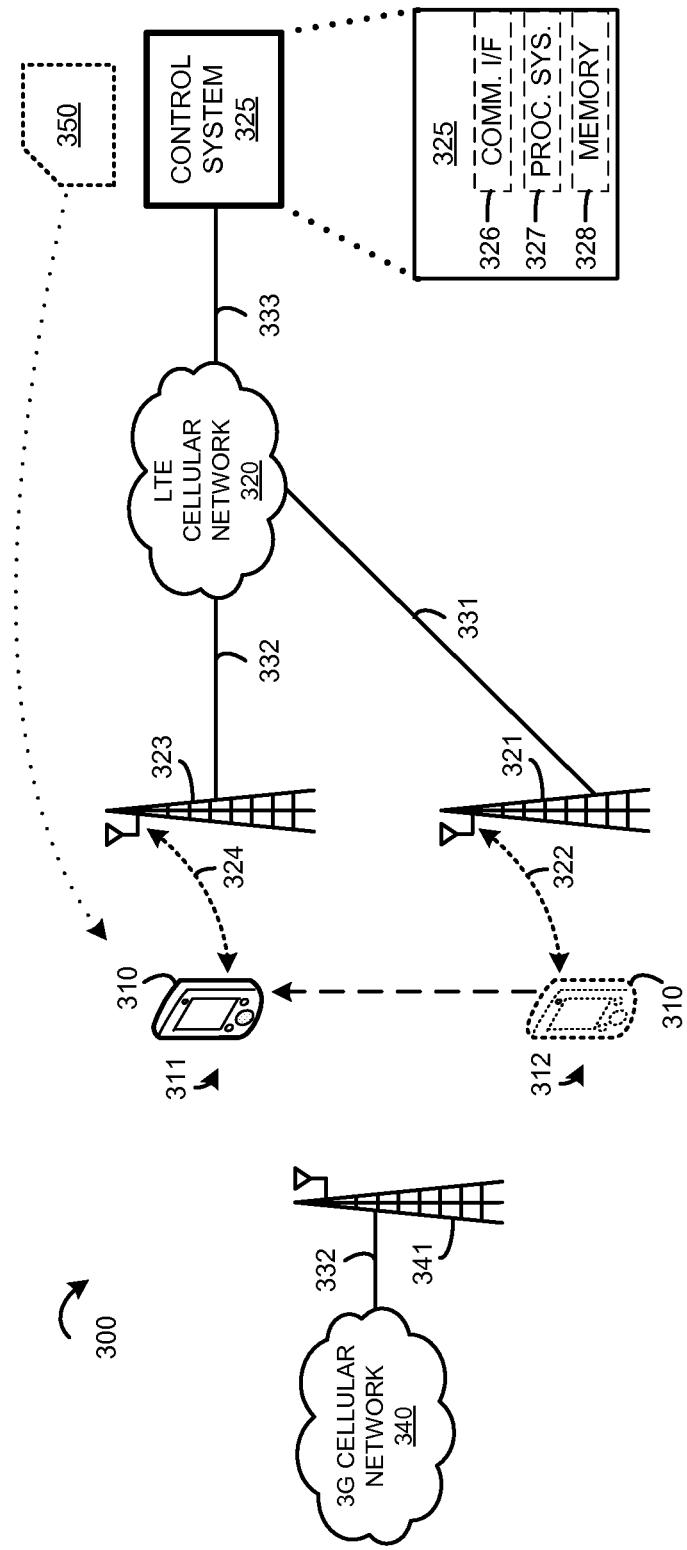
FIG. 3 is a system diagram illustrating a communication system.

FIG. 1 is a system diagram illustrating communication system 100. Communication system 100 includes wireless communication device (WCD) 110, long-term evolution (LTE) network 120, wireless access nodes 121-122, and non-LTE network 130. WCD 110 and wireless access nodes 121-122 communicate over associated wireless links 150-151. LTE network 120 and wireless access nodes 121-122 communicate over associated backhaul links 153-154. WCD 110 and non-LTE network 130 communicate over wireless link 152.

In operation, WCD 110 can receive wireless access to communication services from LTE network 120 via any of LTE wireless access nodes 121-122 or from non-LTE network 130 (wireless access nodes associated with non-LTE network 130 are omitted for clarity). Each of wireless access nodes 121-122 can prove wireless access over a limited coverage area, such as a limited geographic region. WCD 110 can move between the coverage areas of each of wireless access nodes 121-122, with a handoff or handover process ensuring continuous wireless access or an uninterrupted wireless communication session with LTE network 120. WCD 110 can also receive wireless access from non-LTE network 130. In typical examples, LTE network 120 represents a fourth generation (4G) cellular network while non-LTE network 130 includes a lower speed or lower generation network, such as a third generation (3G) cellular network. Other network types can be employed.

FIG. 2 is a flow diagram illustrating a method of operation of communication system 100. The operations of FIG. 2 are referenced herein parenthetically. In FIG. 2, LTE network 120 communicates (201) with WCD 110 over a LTE wireless communication link provided by a first wireless access node. In this example, the first wireless communication link is link 150 and the first wireless access node is node 121, although other configurations can be employed. LTE network 120 detects (202) a handoff from the first wireless access node to a second wireless access node for WCD 110 when WCD 110 is in an idle mode of operation. In this example, the second wireless access node is node 122 providing second wireless communication link 151, although other configurations can be employed. Responsive to the handoff, LTE network 120 transfers (203) network access information 140 for non-LTE network 130 to the wireless communication device. Network access information 140 can include various access information for WCD 110 to access non-LTE network 130, such as access frequency information, access channel information, timing information, among other information, including combinations thereof.

FIG. 3 is a system diagram illustrating communication system 300. Communication system 300 includes wireless communication device 310, LTE cellular network 320, eNodeB equipment 321 and 323, control system 325, third-generation (3G) cellular network 340, and base station 341. WCD 310 is a smartphone device in this example, and can receive wireless access to communication services from 4G networks and 3G networks. WCD 310 can include equipment as discussed herein for WCD 110, although variations are possible. WCD 310 can receive wireless access to 4G communication services from LTE cellular network 320 over LTE wireless links 322 and 324 from associated eNodeB 321 and 323. eNodeB 321 and 323 communicate with LTE cellular network 320 over associated backhaul links 331 and 332, which comprise optical networking links in this example. LTE cellular network 320 and control system 325 communicate over link 333, which is an Ethernet/IP link in this example. WCD 310 can receive wireless access to 3G communication services from 3G cellular network 340 over a 3G wireless link (not shown), such as CDMA, UMTS, or GSM, from base station 341. Base station 341 and 3G cellular network 340 communicate over backhaul link 332, which is a T1 link in this example.

A detailed view of control system 325 is illustrated in FIG. 3. Control system 325 can include equipment and systems as discussed herein for LTE network 120, although variations are possible. Control system 325 includes communication interface 326, processing system 327, and memory 328. In operation, processing system 327 is operatively linked to communication interfaces 326 and memory 327. Processing system 327 is capable of executing software stored in memory 327. When executing the software, processing system 327 drives control system 325 to operate as described herein. Control system 325 can also include a user interface, such as device indicator lights or a web-based interface presented over at least link 333 for monitoring, altering, or controlling a status or configuration of control system 325.

Processing system 327 may be implemented within a single processing device but may also be distributed across multiple processing devices or sub-systems that cooperate in executing program instructions. Examples of processing system 327 include general purpose central processing units, microprocessors, application specific processors, and logic devices, as well as any other type of processing device.

Communication interface 326 includes a network interface for communicating with LTE cellular network 320. The network interface can include a local or wide area network communication interface which can communicate over an Ethernet or Internet protocol (IP) link. Examples of communication interface 326 include network interface card equipment, antennas, power amplifiers, RF circuitry, transceivers, modems, and other communication circuitry.

Memory 328 may comprise any storage media readable by processing system 327 and capable of storing software. Memory 328 may include volatile and nonvolatile, removable and non-removable media implemented in any method or technology for storage of information, such as computer readable instructions, data structures, program modules, or other data. Memory 328 may be implemented as a single storage device but may also be implemented across multiple storage devices or sub-systems. Memory 328 may comprise additional elements, such as a controller, capable of communicating with processing system 327. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 328 may comprise computer program instructions, firmware, or some other form of machine-readable processing instructions having processes that when executed by processing system 327 direct control system 325 to operate as described herein. For example, software drives control system 325 to detect idle mode handoffs of WCD 310 and transfer 3G network access information to WCD 310 in response to the handoffs, among other operations. The software may also include user software applications. The software may be implemented as a single application or as multiple applications. In general, the software may, when loaded into processing system 327 and executed, transform processing system 327 from a general-purpose device into a special-purpose device customized as described herein.

Control system 325 can be included in the equipment or systems of LTE cellular network 320, or can be included in separate equipment or systems, including combinations thereof. Examples of control system 325 may also include software such as an operating system, logs, utilities, drivers, databases, data structures, networking software, and other software stored on a computer-readable medium. Control system 325 can also include an application server, application service provider system, database system, web server, or other systems.

Figure 4:
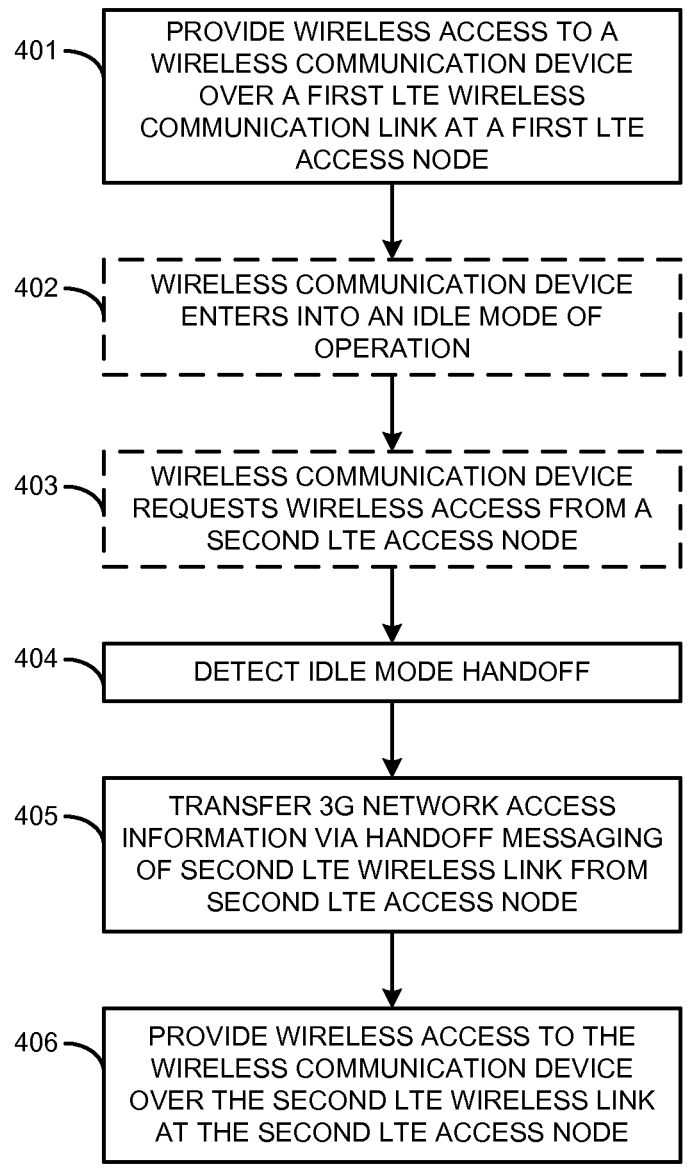
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, LTE cellular network 320 provides (401) wireless access to WCD 310 over a LTE wireless communication link at a first LTE access node. In this example, the first LTE wireless communication link is wireless link 322, and the first LTE access node is eNodeB (node) 321, although other configurations are possible. Node 321 provides wireless access to communication services over a limited geographic area, such a coverage area or sector. While in this coverage area, such as at location 312, WCD 310 can receive wireless access over link 322 from node 321. The communication services can include voice calls, text messaging, and data access provided by LTE cellular network 320. When WCD 310 is not in active use, such as when a voice call or other communication session is not currently active or is session, WCD 310 can enter into an idle mode of operation to save power, wireless resources, or processing resources.

WCD 310 enters (402) into an idle mode of operation, and subsequently requests (403) wireless access from a second LTE access node. WCD 310 can be moved in this example, such as from location 312 to location 311, although a movement is not required. Due to signal quality detected by WCD 310 whether due to movement or changing RF conditions, WCD 310 may prefer to receive wireless access from another eNodeB associated with LTE cellular network 320. In this example, WCD 310 is moved from location 312 to location 311 and requests wireless access from node 323 over wireless link 324. Since WCD 310 was in the idle mode, a voice call or other communication session was not active, and an active mode handoff was not required. Thus, an idle mode handoff occurs for WCD 310.

An idle mode handoff can include situations when WCD 310 is initially registered for wireless access from a first LTE access node and WCD 310 subsequently goes into an idle mode of operation. WCD 310 would not typically tune away to other networks or cellular communication systems, such as 3G cellular network 340, during the idle mode for paging or other network information in this LTE example. In idle mode, WCD 310 can use a timer to initiate a wakeup to check for paging information or incoming calls, but the majority of the time WCD 310 will be at rest and will not transmit. If WCD 310 is stationary or experiences relatively constant RF conditions, the idle-wakeup cycling can continue, but WCD 310 only receives information from nodes instead of transmitting. If WCD 310 moves far enough to alter the RF conditions or signal strength of the present wireless link, then WCD 310 seeks to handoff to another LTE access node. This handoff can occur merely by WCD 310 detecting wireless signals from a second LTE access node, subsequently ceasing monitoring wireless signals from the first LTE access node, and monitoring wireless signals from the second LTE access node. In further examples, the idle mode comprises WCD 310 receiving wireless access from a first LTE access node comprising communications transferred by the wireless communication device over an LTE wireless communication link provided by the first LTE access node, and subsequent to receiving the wireless access from the first LTE access node, WCD 310 ceases transmitting further communications to the first LTE access node for a threshold period of time. In yet further examples, the idle mode exists when WCD 310 is not engaged in a present communication session.

LTE cellular network 320 detects (404) idle mode handoff of WCD 310. To detect the idle mode handoff, various methods can be employed. In a first example, WCD 310 can transfer information such as a request for service from the second LTE access node to indicate that WCD 310 will now receive wireless access from the second LTE access node. In another example, equipment or systems of LTE cellular communication network 320 can track idle wireless communication devices, such as by pinging or polling the devices periodically. In yet further examples, equipment or systems of LTE cellular communication network 320 can identify devices which have initially registered for wireless access followed by participating in an active communication session, and subsequently ended the communication session. A threshold period of time after the ended communication session can indicate an idle device. The handoff can include subsequent to ceasing transmitting the communications to the first LTE access node for a threshold period of time, WCD 310 can detect the second LTE access node and request wireless access from the second LTE access node.

Control system 325 transfers (405) 3G network access information 350 via handoff messaging of a second LTE wireless link from the second LTE access node. In this example, the second LTE wireless link is link 324, and the second LTE access node is eNodeB 323. During the handoff process, various messaging related to the handoff can be exchanged between LTE cellular network 320 and WCD 310 by way of node 323. Within this handoff messaging, 3G network access information 350 is transferred from control system 325 for delivery to WCD 310.

In LTE systems, System Information Messages are typically broadcast to all wireless communication devices, which can include system information block (SIB) portions. The SIB portions can include SIB 6—information for reselection to UMTS cells if no suitable LTE cell is available, SIB 7—information for reselection to GSM cells if no suitable LTE or UMTS cell is available, and SIB 8—information for reselection to CDMA2000 systems, among other portions. These SIB 6-8 portions include information that can be used by WCD 310 to initially detect and access other wireless or cellular communication networks, such as 3G cellular network 340. The information can include access frequency information, access channel information, timing information, among other information, including combinations thereof.

Since these SIBs are normally broadcast to all wireless communication devices on LTE cellular network 320, the SIBs would take up bandwidth and resources of the associated wireless links. Instead, in this example, control system 325 transfers network access information 350 to WCD 310 in handoff messaging directed solely to WCD 310. In some examples, the handoff messaging includes Radio Resource Control (RRC) information or messages. LTE cellular network 320 can also withhold transfer of the network access information in SIB portions of the LTE wireless communication link, such as in SIB 6-8 portions. This withholding of the network access information in the SIB portions can free up the SIB resources and bandwidth which can be used for other communications.

LTE cellular network 320 provides (406) wireless access to WCD 310 over the second LTE wireless link at the second LTE access node. As discussed above, the second LTE wireless link is link 324, and the second LTE access node is eNodeB 323. Thus, at location 311, WCD 310 receives wireless access to communication services over link 324 from node 323. Node 323 also provides wireless access to communication services over a limited geographic area, such a coverage area or sector. While in this coverage area, such as at location 311, WCD 310 can receive wireless access over link 324 from node 323. The communication services can include voice calls, text messaging, and data access provided by LTE cellular network 320.

Since network access information 350 has been transferred to WCD 310, WCD 310 can also seek wireless access from 3G network 340 via base station 341. The network access information can include information which allows WCD 310 to detect pilot signals, beacon signals, or to update initial access frequencies or channels, including spreading codes or spreading code arrangements of network 340.

Referring back to FIG. 1, wireless communication device (WCD) 110 comprises transceiver circuitry and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. In this example, wireless communication device 110 includes multiple transceiver portions or antenna portions, among other circuit and equipment elements, for communicating wirelessly with multiple wireless communication networks, using different wireless communication modes, generations, protocols or technologies.

LTE network 120 comprises communication and control systems for providing access to communication services for user devices. LTE network 120 can provide communication services including voice calls, text messages, data access, or other communication services provided over a cellular communication network. In some examples, LTE network 120 includes equipment to provide wireless access to communication services within different coverage areas to user devices, route communications between content providers and user devices, and facilitate handoffs between equipment of different coverage areas, among other operations. Although the term LTE is used herein, it should be understood that LTE can refer to 3rd Generation Partnership Project (3GPP) Long Term Evolution, LTE Advanced, or can instead comprise other fourth-generation cellular communication system, such as Worldwide Interoperability for Microwave Access (WiMAX), including combinations, variations, and improvements thereof. LTE network 120 may also comprise elements such as E-UTRAN Node B equipment, eNodeB equipment, Evolved Node B equipment, Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, preferred routing list (PRL) systems, or other communication and control equipment.

Wireless access nodes 121-122 are associated with LTE network 120, and each provide wireless links for wireless access to the communication services of LTE network 120. Wireless access nodes 121-122 each comprises RF communication and control circuitry, transceivers, and antennas, as well as wireless communications equipment capable of communicating with and providing wireless access within a wireless coverage area to communication services for wireless communication devices, such as WCD 110. The RF communication circuitry typically includes amplifiers, filters, RF modulators, transceivers, and signal processing circuitry. Wireless access nodes 121-122 may also each comprise elements such as E-UTRAN Node B equipment, eNodeB equipment, Evolved Node B equipment, Evolved Universal Terrestrial Radio Access (E-UTRA) network equipment.

Non-LTE network 130 comprises communication and control systems for providing access to communication services for user devices. Non-LTE network 130 can provide communication services including voice calls, text messages, data access, or other communication services provided over a cellular communication network. In some examples, Non-LTE network 130 includes equipment to provide wireless access to communication services within different coverage areas to user devices, route communications between content providers and user devices, and facilitate handoffs between equipment of different coverage areas, among other operations. Although the term non-LTE is used herein, it should be understood that non-LTE can refer to Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), or other first, second, or third-generation cellular communication system, including combinations, variations, and improvements thereof. Non-LTE network 130 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, preferred routing list (PRL) systems, or other communication and control equipment.

Communication links 153-154 each use metal, glass, optical, air, space, or some other material as the transport media. Communication links 153-154 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 153-154 can each be a direct link or may include intermediate networks, systems, or devices, and can include a logical network link transported over multiple physical links.

Wireless links 150-151 each use the air or space as the transport media. Wireless links 150-151 each comprise a cellular communication link, and may use various protocols, such as long-term evolution (LTE), LTE advanced, Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), or some other cellular or wireless communication format, including combinations, improvements, or variations thereof.

Wireless link 152 uses the air or space as the transport media. Wireless link 152 comprises a cellular communication link, and may use various protocols, such as Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), or some other cellular or wireless communication format, including combinations, improvements, or variations thereof.

Although one main wireless link for each of wireless links 150-152 is shown in FIG. 1, it should be understood that wireless links 150-152 are merely illustrative to show communication modes or wireless access pathways for WCD 110. In other examples, further wireless links can be shown, with portions of the further wireless links shared and used for different communication sessions or different content types, among other configurations.

Communication links 150-154 may each include many different signals sharing the same associated link, as represented by the associated lines in FIG. 1, comprising resource blocks, access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:
   communicating with a wireless communication device over a long-term evolution (LTE) wireless communication link provided by a first LTE wireless access node;
   detecting a handoff from the first LTE wireless access node to a second LTE wireless access node for the wireless communication device when the wireless communication device is in an idle mode of operation;
   responsive to the handoff, transferring network access information for a non-LTE network to the wireless communication device in handoff messaging associated with the handoff.

2. The method of claim 1, further comprising:
withholding transfer of the network access information in a system information block (SIB) portion of the LTE wireless communication link.

3. The method of claim 2, wherein the SIB comprises at least one of a SIB 6, SIB 7, and SIB 8.

4. The method of claim 2, wherein the SIB portion is broadcast for receipt by a plurality of wireless communication devices, and wherein the network access information is transferred for receipt by the wireless communication device and not for receipt by the plurality of wireless communication devices.

5. The method of claim 1, wherein transferring the network access information comprises transferring further network access information in a radio resource control (RRC) message.

6. The method of claim 1, wherein the non-LTE network comprises a third-generation (3G) cellular network comprising at least one of a Code Division Multiple Access (CDMA) network, a Global System for Mobile Communications (GSM) network, and a Universal Mobile Telecommunications System (UMTS) network.

7. The method of claim 1, wherein the network access information comprises access frequency information for the non-LTE network.

8. The method of claim 1, wherein the idle mode of operation comprises:
the wireless communication device receiving wireless access from the first LTE wireless access node comprising communications transferred by the wireless communication device over the LTE wireless communication link provided by the first LTE wireless access node; and
subsequent to receiving the wireless access from the first LTE wireless access node, the wireless communication device ceasing transmitting further communications to the first LTE wireless access node for a threshold period of time.

9. The method of claim 8, wherein the handoff comprises:
subsequent to ceasing transmitting the communications to the first LTE wireless access node for the threshold period of time, the wireless communication device detecting the second LTE wireless access node and requesting wireless access from the second LTE wireless access node.

10. A communication system, comprising:
a first long-term evolution (LTE) wireless access node configured to communicate with a wireless communication device over an LTE wireless communication link provided by the first LTE wireless access node;
a control system configured to detect a handoff from the first LTE wireless access node to a second LTE wireless access node for the wireless communication device when the wireless communication device is in an idle mode of operation;
responsive to the handoff, the second LTE wireless access node configured to transfer network access information for a non-LTE network to the wireless communication device in handoff messaging associated with the handoff.

11. The communication system of claim 10, further comprising:
the first LTE wireless access node configured to withhold transfer of the network access information in a system information block (SIB) portion of the LTE wireless communication link provided by the first LTE wireless access node; and
the second LTE wireless access node configured to withhold transfer of the network access information in a system information block (SIB) portion of a LTE wireless communication link provided by the second LTE wireless access node.

12. The communication system of claim 11, wherein the SIB portion comprises at least one of a SIB 6, SIB 7, and SIB 8.

13. The communication system of claim 11, wherein the SIB portion is broadcast for receipt by a plurality of wireless communication devices by the first LTE wireless access node and the second LTE wireless access node, and wherein the network access information is transferred by the second LTE wireless access node for receipt by the wireless communication device and not for receipt by the plurality of wireless communication devices.

14. The communication system of claim 10, wherein the second LTE wireless access node is configured to transfer further network access information in a radio resource control (RRC) message.

15. The communication system of claim 10, wherein the non-LTE network comprises a third-generation (3G) cellular network comprising at least one of a Code Division Multiple Access (CDMA) network, a Global System for Mobile Communications (GSM) network, and a Universal Mobile Telecommunications System (UMTS) network.

16. The communication system of claim 10, wherein the network access information comprises access frequency information for the non-LTE network.

17. The communication system of claim 10, wherein the idle mode of operation comprises:
the wireless communication device receiving wireless access from the first LTE wireless access node comprising communications transferred by the wireless communication device over the LTE wireless communication link provided by the first LTE wireless access node; and
subsequent to receiving the wireless access from the first LTE wireless access node, the wireless communication device ceasing transmitting further communications to the first LTE wireless access node for a threshold period of time.

18. The communication system of claim 17, wherein the handoff comprises:
subsequent to ceasing transmitting the communications to the first LTE wireless access node for the threshold period of time, the wireless communication device detecting the second LTE wireless access node and requesting wireless access from the second LTE wireless access node.

* * * * *